US006959913B2

(12) United States Patent
Hansen

(10) Patent No.: US 6,959,913 B2
(45) Date of Patent: Nov. 1, 2005

(54) ACTUATOR

(75) Inventor: Robert A. Hansen, North Oakdale, MN (US)

(73) Assignee: Dynamic Air Inc., St. Paul, MN (US)

( * ) Notice: Subject to any disclaimer, the term of this patent is extended or adjusted under 35 U.S.C. 154(b) by 147 days.

(21) Appl. No.: 10/461,892

(22) Filed: Jun. 13, 2003

(65) Prior Publication Data

US 2004/0251445 A1 Dec. 16, 2004

(51) Int. Cl.[7] .......................... F15B 15/08; F15B 15/14; F16J 9/05; F16J 15/56

(52) U.S. Cl. ....................................... 251/250; 251/355

(58) Field of Search .................................. 251/250, 355

(56) References Cited

U.S. PATENT DOCUMENTS 4,890,645 A * 1/1990 Andersen ............... 137/625.66
4,895,037 A * 1/1990 Komatsu ..................... 74/422
4,928,577 A 5/1990 Stoll ........................... 92/177
6,173,965 B1 1/2001 Niessen ...................... 277/584

FOREIGN PATENT DOCUMENTS

| | | |
|---|---|---|
| DE | 44 11 006 A1 | 12/1994 |
| EP | 0 099 546 | 2/1984 |
| FR | 1 509 067 | 1/1968 |

* cited by examiner

*Primary Examiner*—J. Casimer Jacyna
(74) *Attorney, Agent, or Firm*—Jacobson & Johnson

(57) ABSTRACT

An actuator having a set of slidable pistons including sliding regions with the sliding regions including at least one wear member supported by a resilient member and a second wear member laterally spaced from the first wear member with a lubrication reservoir located therebetween for maintaining the wear members in lubricated sliding engagement with the cylindrical walls of the housing to limit the need to replace or repair the actuator. In order to provide ingress and egress of fluid from the chambers within the actuator a channel passage extends along the back side of the extension of the piston to permit quick venting of fluid therefrom.

17 Claims, 4 Drawing Sheets

ACTUATOR

FIELD OF THE INVENTION

This invention relates generally to actuators and more specifically to actuator controlled equipment that requires extended run times before repair or replacement of the actuator.

CROSS REFERENCE TO RELATED APPLICATIONS

None.

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of rack and pinion actuators for converting linear motion into rotational motion is known in the art. One of difficulties with conventional actuators is that the actuators often need to be replaced or repaired due to repeated use. In certain applications the repair or replacement of the actuators needs to be minimized since the whole system may need to be shut down to repair or replace the actuator. Because of the unbalanced arrangement of forces on rack and piston actuators it is often times difficult to obtain an extended operating life for a rack and pinion actuator. The present invention provides a long life actuator that eliminates the need for frequent repair or replacement of the actuators.

SUMMARY OF THE INVENTION

Briefly, the invention comprises an actuator having a set of slidable pistons including sliding regions with the sliding regions including at least one wear member supported by a resilient member. A second wear member can be laterally spaced from the first wear member with a lubricant carried therebetween for maintaining the wear members in lubricated sliding engagement with the cylindrical walls of the housing to limit the need to replace or repair the actuator. In order to provide rapid ingress and egress of fluid from the chambers within the actuator a channel passage extends along the back side of an extension of each of the piston to permit quick venting of fluid.

DESCRIPTION OF THE PREFERRED EMBODIMENT

Figure 1:
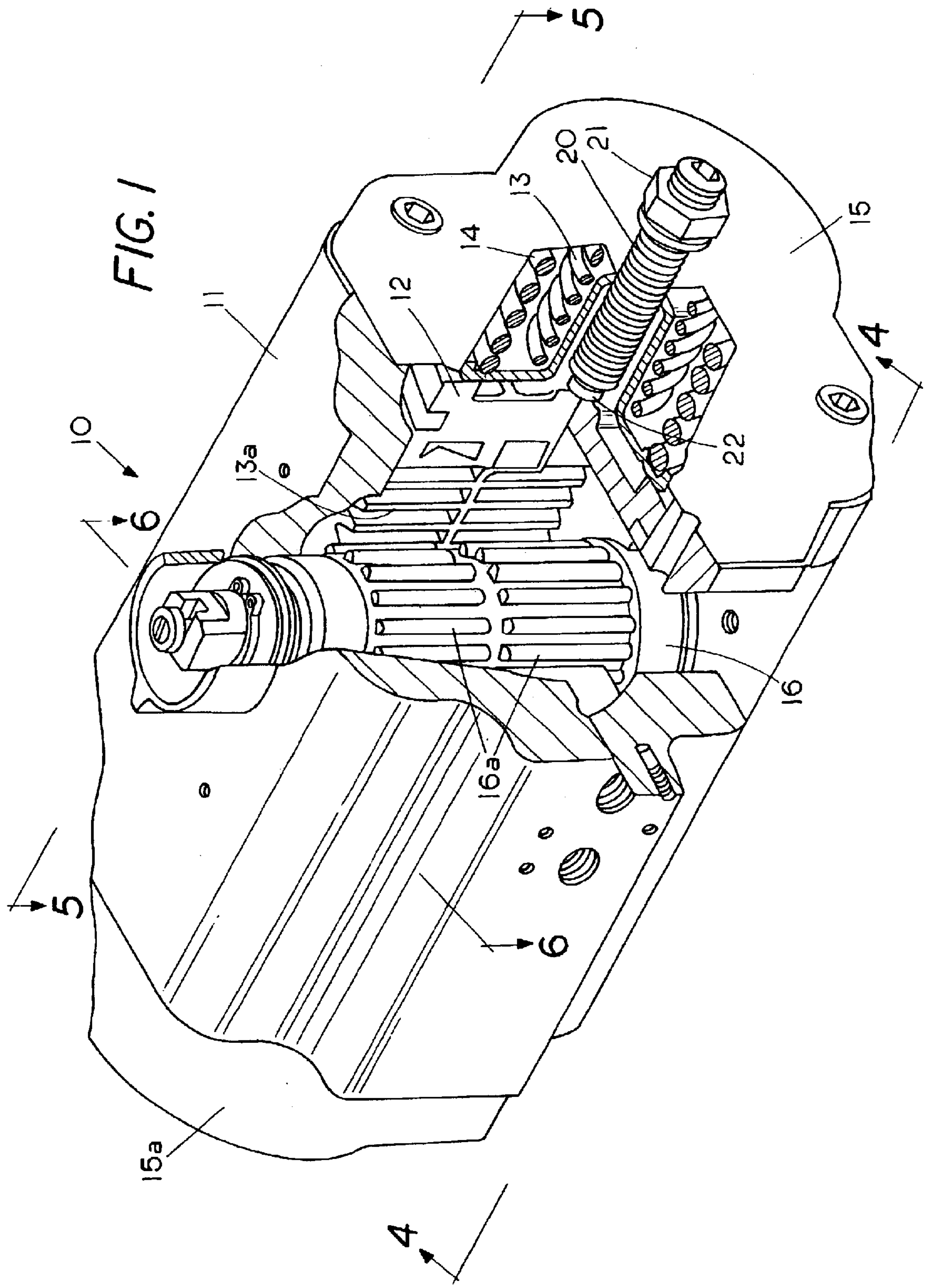
FIG. 1 shows a partial cutaway view of the long life rack and pinion actuator of the present invention.

FIG. 1 shows a partial cutaway view of the long life rack and pinion actuator 10 of the present invention. Actuator 10 comprises a housing 11 having an end cap 15 on one end and an end cap 15*a* on the opposite end. Located centrally and rotationally mounted within housing 11 is a rotatable shaft 16 having an upper and lower set of peripheral teeth 16*a* thereon. Located in meshing engagement with the teeth 16*a* is a piston extension rack 12*a* that extends outward from the face of piston 12. A set of springs 13 and 14 provide a stop for piston 12 when the piston is retracted. A bolt 20 having a stop end 22 and a nut 21 thereon provides for adjustment of stop end 22 which engages the back side of piston 12. While only one piston is shown in FIG. 1 the actuator is symmetrical and includes a second piston on the opposite end of actuator 10.

Figure 2:
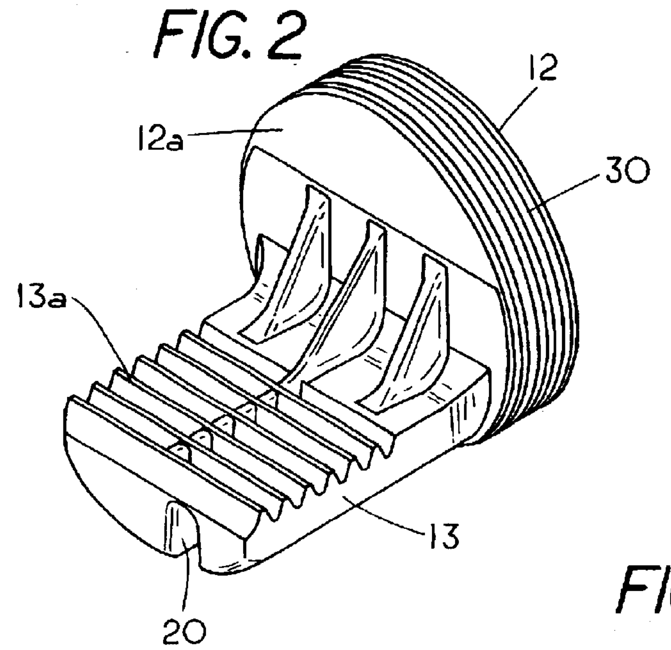
FIG. 2 shows an isolated top side perspective view of a piston in the actuator of FIG. 1.

FIG. 2 shows an isolated top side perspective view of piston 12 with piston 12 having a cylindrical skirt 30 and an offset extension 13 that extends from face 12*a* of piston 12. Located on extension 13 are a rack of teeth 13*a* for engaging the teeth 16*a* on rotateable shaft 16. Located on the lower side of extension 13 is a channel vent passage 20 to permit ingress and egress of fluid therethrough. As the teeth 13*a* on the offset extension are also offset from the center of the piston 12 and the teeth 13*a* are used to drive the rotatable shaft 16*a* there is an inherent unbalance of forces on the face of the pistons produces unequal forces on the skirt of the piston which carries the sealing members, which can lead to higher wear areas on portions of the skirt of the pistons.

Figure 3:
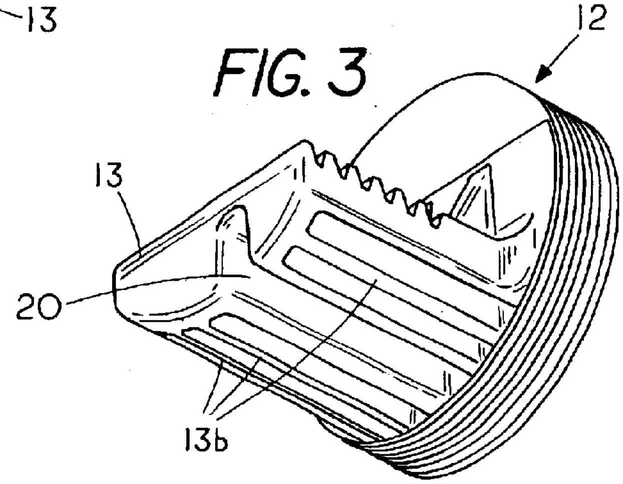
FIG. 3 shows an isolated bottom side perspective view of a piston in the actuator of FIG. 1.

FIG. 3 shows an isolated bottom side perspective view of piston 12 revealing the channel passage 20 that extends longitudinally along the lower side of extension 13 as well as the integral elongated reinforcement ribs 13*b* for extensions 13.

Figure 4:
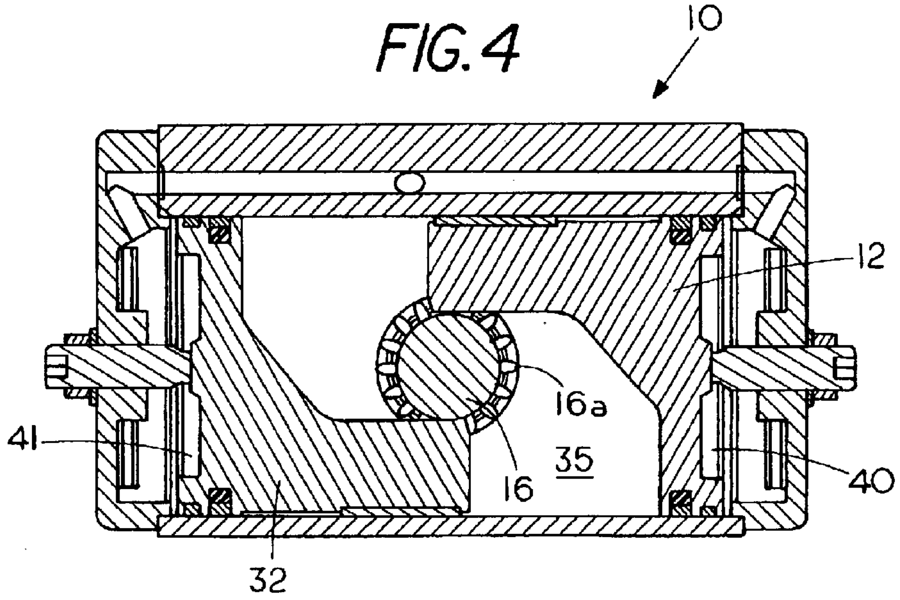
FIG. 4 is a cross sectional view taken along lines 4—4 of FIG. 1.

FIG. 4 shows a cross sectional view taken along lines 4—4 of FIG. 1 showing the piston 12 and piston 32 in engagement with teeth 16*a* on rotateable shaft 16. The piston 32 and piston 12 are identical to each other.

In operation of actuator 10, if the pressure in piston end chamber 40 and piston end chamber 41 is greater than the pressure in central chamber 35 the pistons 12 and 32 are driven toward each other (indicated by arrows) thereby causing counter clockwise rotation of shaft 16 as the teeth on extension of each of the piston 12 and 32 engage the teeth 16*a* on the shaft and rotate the shaft 16. Similarly, if the pressure in the central chamber 35 is higher than the pressure in piston end chamber 40 and 41 the pistons are driven away from each other causing clockwise rotation of shaft 16 through engagement with the teeth 16*a* thereon. Thus through controlling the pressure in piston end chamber 40 and 41 as well as central chamber 35 one can drive pistons 12 and 32 back and forth within the cylindrical sidewalls 11*a*.

Figure 5:
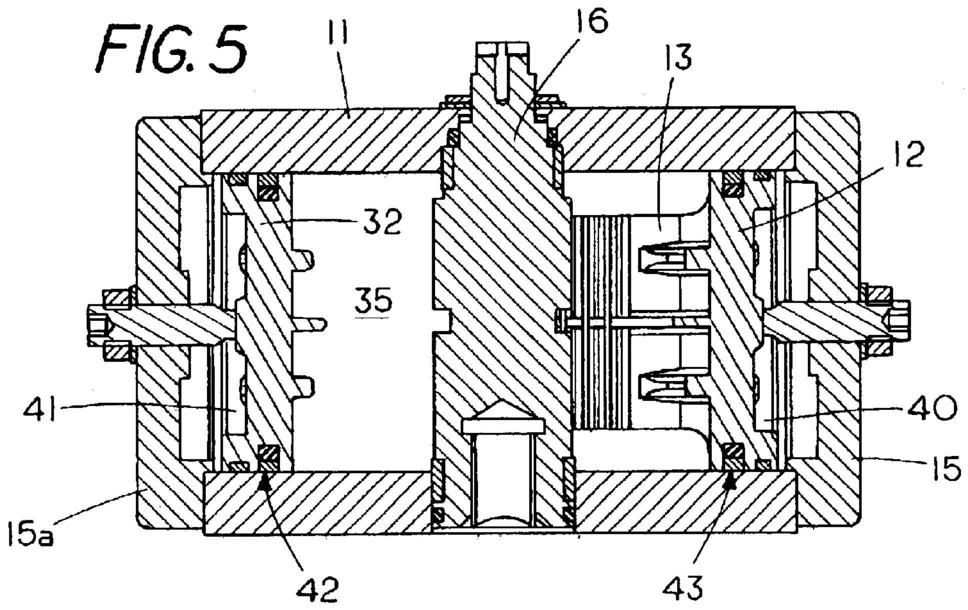
FIG. 5 is a cross sectional view taken along lines 5—5 of FIG. 1.

FIG. 5 is a cross sectional view taken along lines 5—5 of FIG. 1 showing the piston 12 and 32 in relation to the shaft 16 which is rotateable mounted in housing 11. Piston 12 includes a peripheral sealing and lubrication region 43 and similarly piston 32 includes a peripheral sealing and lubrication region 42.

Figure 5A:
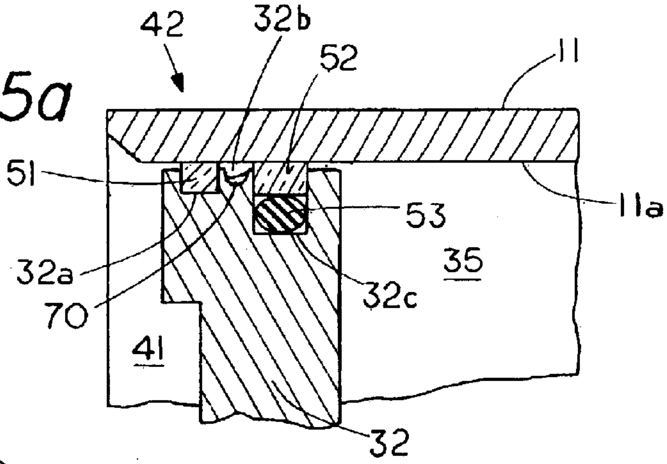
FIG. 5*a* is an enlarged view of a portion of the sliding region on the piston in the actuator.

FIG. 5*a* shows the sliding region 42 of piston 32 in greater detail. Housing 11 has a cylindrical piston wall surface 11*a* for piston 32 to slide therealong. Located on the skirt of piston 32 are three circumferential recesses 32*a*, 32*b* and 32*c*. Recess 32*a* carries an annular wear member 51 to permit sliding engagement with wall surface 11*a*. Similarly, recess 32*c* carries a wear member 52 to permit sliding engagement with wall surface 11*a*. In addition recess 32*c* carries a resilient sealing member 53, such as an elastomer, to prevent flow therearound as well as resilient hold wear member 52 against wall 11*a* to allow piston 32 to slide laterally along cylindrical sealing wall 11*a*. In the embodiment shown the wear members 51 and 52 are made from a rigid wear material such as nylon or the like, which is softer than the cylindrical sealing wall 11*a*, yet sufficiently durable so as to be able to withstand repeated sliding engagement without having to be replaced.

Located between recess 32*a* and 32*c* is an annular lubrication recess 32*b* for carrying a lubricant. A solid or viscous lubricant can be placed in the lubrication recess 32*b* to enable the lubrication to be carried on the piston skirt as the piston 32 slides back and forth thereby enabling the lubricant to be continually available proximate the wear members 51 and 52. Thus, the lubricant 70 which can be maintained in recess 32*b* is available for continual lubrication of the surface 11*a* so as to minimize wear as the piston 32 slides back and forth with the wear members 51 and 53 in sliding engagement with cylindrical wall surface 11*a*.

Figure 6:
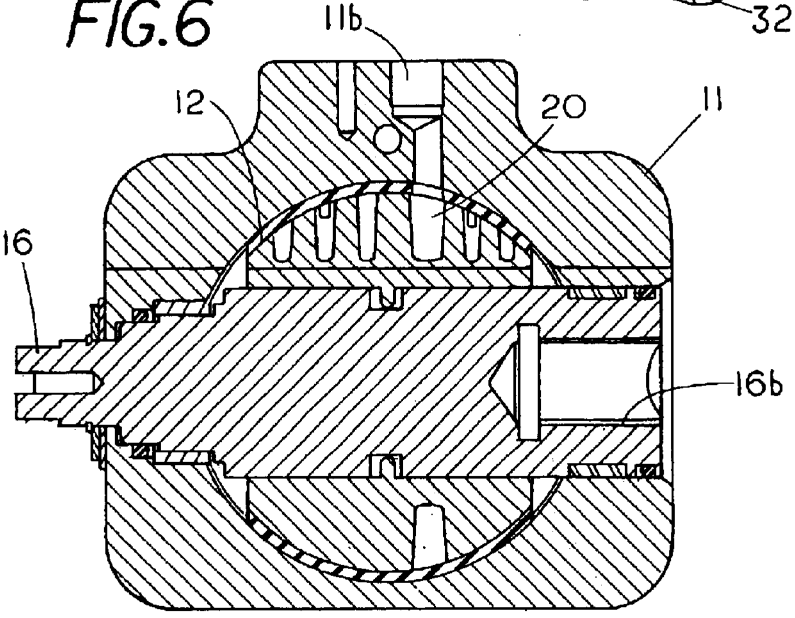
FIG. 6 is a sectional view taken along lines 6—6 of FIG. 1.

FIG. 6 shows a cross sectional view of actuator 10 showing the channel passage 20 is in fluid communication with a passage 11*b* in housing wall 11 to permit fluid to escape from the central chamber 35 as the pistons 12 and 32 move back and forth.

Figure 7:
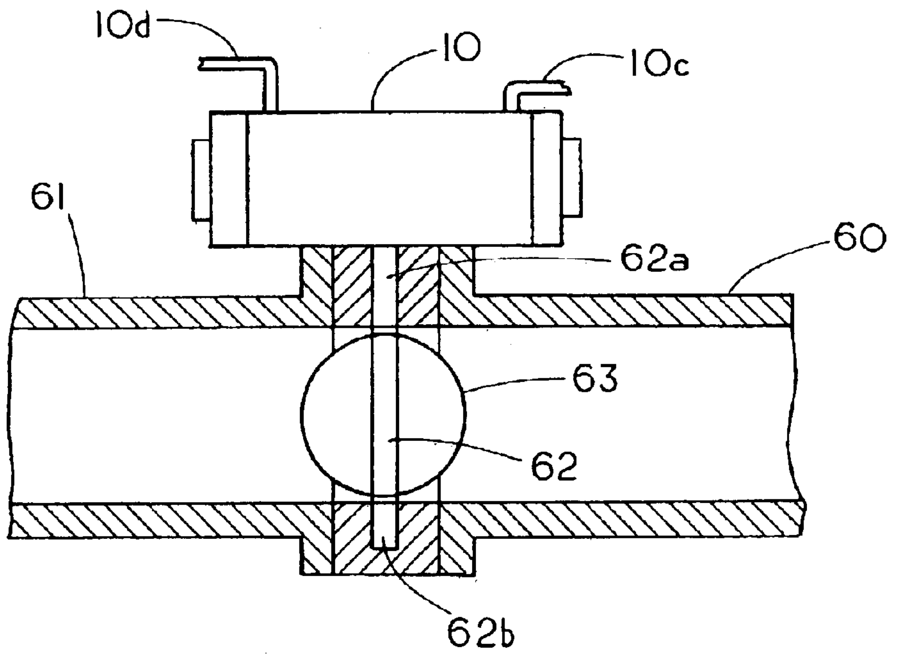
FIG. 7 is a conveying systems having the actuator of the present invention controlling a disk valve.

The actuator 10 of the present invention is useful in many types of systems. FIG. 7 shows the actuator 10 of the present invention mounted on a rotatable valve such as a disk valve 63 found in a conveying system. In the embodiment shown a first conduit 61 is connected to conduit 60 with a disk valve 63 positioned in the passage. A shaft 62 carries disk valve 63 with shaft 62 having a top end 62*a* for engagement the rotateable shaft 16 of the actuator 10. The lower end 62*b* provides for rotational support of the lower end of shaft 16. Actuator 10 is provide with fluid ports 10*c* and 10*d* which are connected to the chambers within actuator 10 so that the pistons 12 and 32 can be driven back and forth thereby causing rotation of shaft 16*a* which in turn rotates shaft 62 to open or close the passage from conduit 61 to conduit 62. As can be seen in FIG. 7 the disk valve 63 is shown positioned in the open position to allow flow of fluid past either side of disk 63. In order to close off the passage the disk 63 is rotated 90 degrees so that the disk 63 is perpendicular to the conduits 60 and 61.

Figure 8:
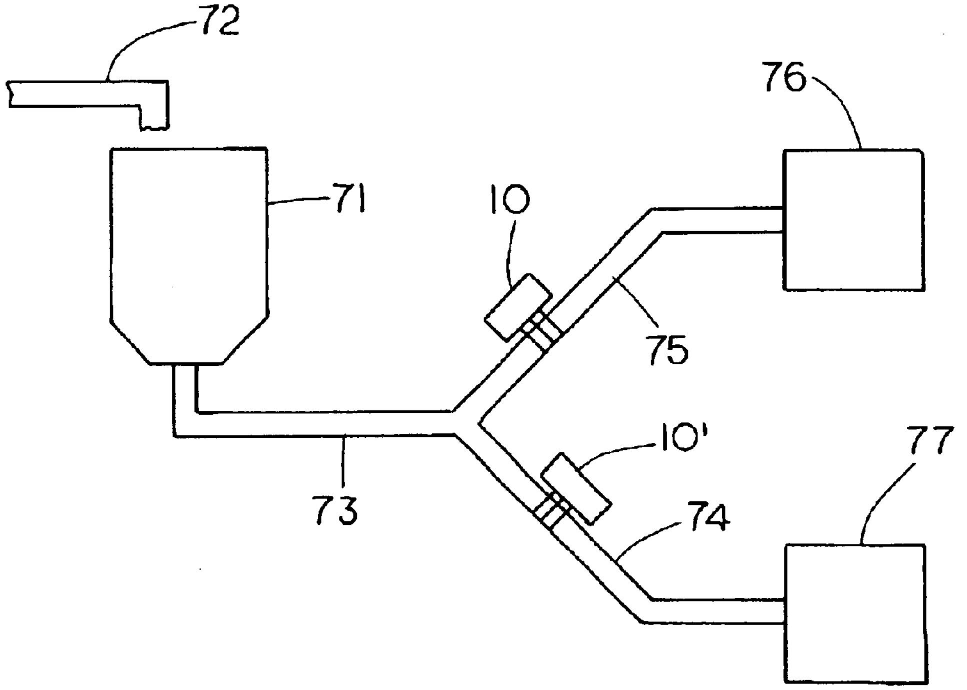
FIG. 8 is a conveying system utilizing a pair of actuators with a pair of disk valves to control the delivery of material into a set of bins.

FIG. 8 shows a system wherein a set of actuators 10 and 10' are connected to disk valves to permit diverting a material in the system. In the system shown in FIG. 8 material is delivered to hopper 71 though conduit 72. The material then flows into pipe 73 and into branch pipes 74 and 75. If the valve to actuator 10 is in the open condition the material flows into bin 76 but if the valve is in the closed condition material is prevent from flowing into bin 76. Similarly, if the valve attached to actuator 10' is in the open condition the material flows into bin 77 but if the valve is in the closed condition material is prevent from flowing into bin 77.

With the combination of the wear members of the present invention and the lubricant reservoir over a million piston cycles are obtainable without having to replace or repair the actuator.

Thus the invention includes a method for extending the cycle life of a rack and pinion actuator comprising the steps of forming at least two spaced apart wear member which are carried on a skirt of a piston for forming sliding engagement with a cylinder wall and placing an elastomer member proximate at least one of the spaced apart wear members to prevent flow of fluid the repast as well as to resiliently maintain the at least one of the spaced apart wear members in resilient contact with the cylinder wall. In addition by including the step of placing a non-runable lubricant such as viscous or solid lubricant between the spaced apart members one can provide for on-the-go lubrication of the wear members.

The invention thus includes a conveying system with an actuator having a rotatable shaft and a set of pistons slidable in a cylinder, each of the pistons having a set of teeth for engaging with a set of teeth on the rotateable shaft so that displacement of the pistons toward or away from each other produces at least a partial rotation of the rotateable shaft. Each of the pistons has a skirt carrying a first wear member, a lubricant and a second wear member located on the skirt. Located proximate one of the wear member is an inner resilient or elastomer sealing member for preventing flow of fluid the repast with lubricant carried therein maintaining a lubricated state between the cylinder and the wear member to allow for repeated displacement of the pistons without having to replace the sealing or the wear member.

With the lubrication recess extending around the peripheral circumferential region of the skirt of each of the pistons one can and carry a lubricant for 360 degree lubrication of the wear members.

I claim:

1. A system:

an actuator, said actuator having a rotatable shaft and a set of pistons slidable in a cylinder, each of said pistons having a set of teeth for engaging with a set of teeth on the rotateable shaft so that displacement of the pistons toward or away from each other produces at least a partial rotation of the rotateable shaft; each of said set of pistons having a skirt, each of said skirts carrying a first wear member, a lubricant and a sealing member, said sealing member comprising a resilient member for preventing flow of fluid therepast and for maintain an outer wear member in contact with the cylinder; said lubricant for maintaining an on-the-go lubricated state between the cylinder and the wear member to allow for repeated displacement of said pistons without having to replace the sealing member thereon.

2. The system of claim 1 including a conduit and a valve for opening the conduit as the valve is rotated in one direction and for closing the conduit when the valve is rotated in the opposite direction.

3. The system of claim 2 wherein the rotatable shaft of said actuator connects to the valve to permit opening and closing of the valve through a linear displacement of said piston.

4. The system of claim 1 including a recess on each of said skirts with each of said recess holding a further wear member therein.

5. The system of claim 4 including a lubrication recess on each of the skirts which is positioned between the further wear member and the wear member.

6. The system of claim 1 wherein the wear member comprises a polymer plastic member.

7. The system of claim 1 wherein the wear member and the lubrication carried on said skirt is a sufficient amount of lubricant to permit at least one million displacement cycles of said pistons without relubrication or replacing the wear member.

8. The system of claim 1 wherein each of the pistons includes an extension with a rack of teeth thereon.

9. The system of claim 1 wherein each of the pistons includes a set of ribs in the extension.

10. The system of claim 9 including an elongated channel vent passage extending along each of the extensions to permit venting of air from a central chamber located between said set of pistons.

11. The system of claim 1 wherein the lubricant comprises a viscous lubricant.

12. A rack and pinion actuator with the rack and pinion actuator having a pair of slidable pistons each having a rack of teeth in engagement with a rotateable shaft with the improvement comprising an improved sliding region on a skirt of each of the pistons with the improved sliding region containing a wear member supported in pressure contact adjacent a cylinder wall by a resilient sealing member and a lubrication recess extending around the peripheral region of the skirt and carrying a lubricant for 360 degree lubrication of the wear member.

13. The rack and pinion actuator of claim 12 including a second wear member located on the skirt of each of the pistons to provide sliding support to the each of the pistons.

14. The rack and pinion actuator of claim 13 wherein each of the wear members are secured in a recess extending circumferentially around each of the skirts of said piston.

15. The rack and pinion actuator or claim 14 wherein the resilient sealing member comprises an elastomer ring.

16. The rack and pinion actuator or claim 15 wherein each of the pistons includes an extension with a channel passage located along a back side thereof for venting a fluid from a central chamber in the rack and pinion actuator.

17. The rack and pinion actuator of claim 16 wherein a rotatable disk valve is connected to a rotatable shaft in the rack and pinion actuator to permit opening and closing of the disk valve when the disk valve is mounted in a conveying system.

* * * * *